April 26, 1960   V. COOK   2,934,419
METHOD OF TREATING SEA WATER
Filed Sept. 19, 1955
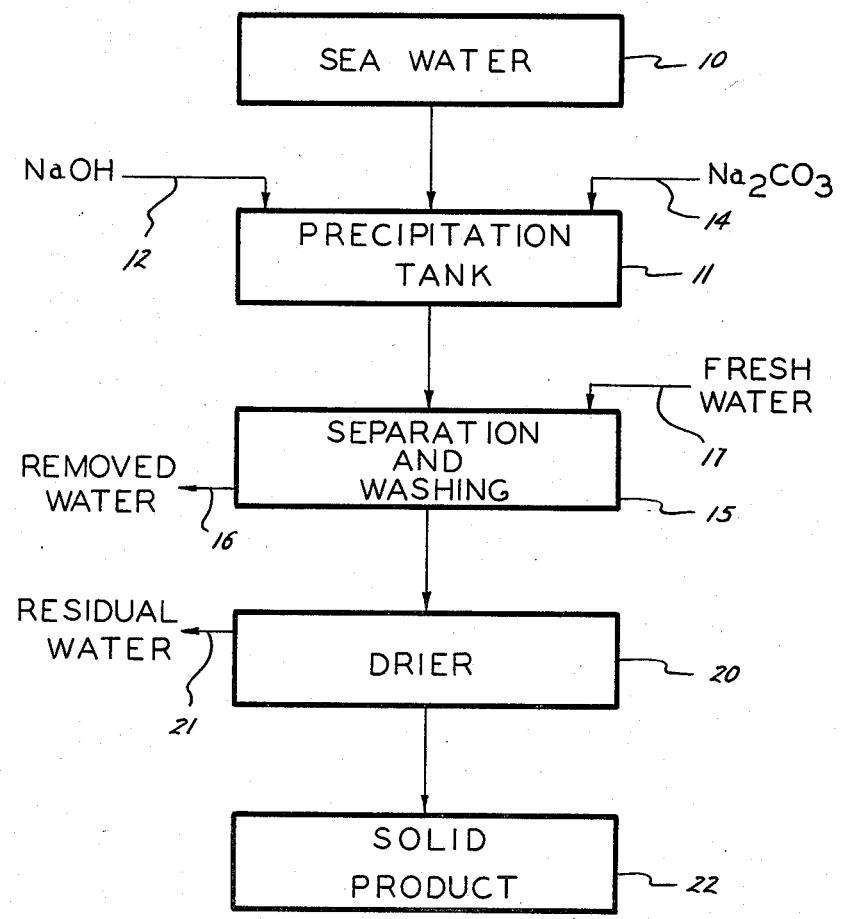
Vernice Cook
INVENTOR.
BY J. Vincent Martin
Joe E. Edwards
B. R. Pravel
ATTORNEYS

United States Patent Office 2,934,419
Patented Apr. 26, 1960

2,934,419
METHOD OF TREATING SEA WATER

Vernice Cook, Houston, Tex., assignor to Dixie Chemical Company, Inc., Houston, Tex., a corporation of Delaware Application September 19, 1955, Serial No. 535,205

2 Claims. (Cl. 71—1)

This invention relates to new and useful improvements in methods of treating sea water and products therefrom.

More particularly, this invention relates to new and useful improvements in the method of, and the resulting product from, the recovery and concentration of dissolved and/or suspended chemical elements and compounds other than sodium chloride from sea water.

In U.S. Patent No. 2,606,839, a method of concentrating sea water to obtain a mineral sea salt is disclosed. Such product contains the so-called "trace elements" along with relatively large quantities of sodium chloride, the main mineral constituent of sea water. In some instances, the large quantity of the sodium chloride is undesirable, as for example when it is desired to add the trace elements or other constituents of the sea salt to the soil in areas where such constituents are lacking or have been depleted. In such a case, the sodium chloride is undesirable because it is somewhat toxic to terrestrial plants when applied to the soil in relatively high concentrations.

Therefore, it is one object of this invention to provide a new and improved method, and product resulting therefrom, for producing the sea salt of said Patent 2,606,839, but with substantially all of the sodium chloride removed therefrom and with the quantities of the trace elements increased in comparison to the quantities of the trace elements present in the product of said Patent No. 2,606,839.

An important object of this invention is to provide a new and improved method, and product resulting therefrom, wherein a solid product is produced from sea water which has substantially all of the sodium chloride removed but which has present therein all of the dissolved and suspended components of sea water in substantially the same relative quantities as they are found in the sea water.

Another object of this invenhtion is to provide a new and improved method, and product resulting therefrom, wherein a solid product is produced from sea salt by forming a precipitate having a relative large surface area which adsorbs the other elements present in sea water, including the trace elements present in relatively minute quantities, to thereby extract and concentrate substantially all of the elements present in the sea water.

Other objects of this invention will become evident from a reading of the following specification and by reference to the accompanying drawings forming a part thereof, wherein one embodiment of the invention is set forth and wherein the figure is a schematic flow sheet illustrating the method of this invention.

As illustrated in the drawings, the sea water 10 of any salinity is treated in a precipitation tank or container 11 with caustic soda (NaOH), or any other alkali base or alkaline earth base that yields hydroxyl ions on hydrolysis. The caustic soda is indicated in the drawings as being fed through line 12 to the tank 11. The concentration of the caustic soda is such that the number of hydroxyl ions added from the line 12 is chemically equivalent to the total concentration of the magnesium ions present in the sea water from the source 10. Soda ash ($Na_2CO_3$) or any other alkali carbonate or alkaline earth carbonate is also added to the sea water in the tank 11 in such a concentration that the carbonate ions added are chemically equivalent to the calcium ions present in the sea water. The soda ash is schematically indicated on the drawing as being added to the tank 11 through line 14, and such addition may be simultaneously with, or at different times from, the addition of the caustic soda. Preferably, the sea water with the caustic soda and soda ash added thereto is agitated in the tank 11 to complete the dissolving and reaction of the caustic soda.

A precipitation occurs within a few minutes after the foregoing addition of chemicals to the tank 11 from the lines 12 and 14, and such precipitate is substantially all magnesium hydroxide and calcium carbonate. The surface area of such magnesium hydroxide precipitate is tremendous, largely due to the fact that it precipitates out in very small particles. The calcium carbonate precipitate also has a large surface area. The magnesium hydroxide and calcium carbonate precipitates adsorb the trace elements in the sea water on their large surface areas and thereby the trace elements are also separated as solids from the sea water. The sodium carbonate is converted to sodium chloride and substantially all of such sodium chloride dissolves in the mother liquor along with the sodium chloride which was naturally present in the sea water. A slight amount of the sodium chloride is adsorbed by the precipitates along with the trace elements and therefore appears as solid sodium chloride.

The solids are next separated from the liquor as indicated at 15 in the drawing by filtration, centrifuging, by allowing the precipitate to settle and siphoning off the mother liquor, or by any other method of separating solids from liquids. The removed water is discharged as indicated at line 16. In order to control the amount of sodium chloride in the final solid product, the precipitate is washed with fresh water introduced through line 17 so as to dissolve the solid sodium chloride and discharge same with the removed water at outlet line 16. By such washing procedure, the sodium chloride can be substantially removed, if desired, or the quantity thereof can be reduced to the extent that it is non-toxic to plants when applied to the soil.

Finally, the solids from the separation and washing step are dried as shown at 20 in the drawings by any conventional drying means such as a rotary kiln or a rotary vacuum filter. The residual water is thus removed by evaporation as schematically shown at 21 while the solid product is obtained at 22, which is white in color, nondeliquescent and very slightly water soluble.

Although the quantities of the sea water and added chemicals may vary within limits, the following example is illustrative of the quantities in a typical operation involving the foregoing sequence of steps. Thus, starting with 1990 gallons of sea water, 71 pounds of sodium hydroxide (NaOH) and 18 pounds of sodium carbonate ($Na_2CO_3$) are added so that the hydroxyl ions from the sodium hydroxide are chemically equivalent to the magnesium ions present in the sea water and so that the carbonate ions from the sodium carbonate are chemically equivalent to the calcium ions present in the sea water. After washing the precipitate at step 15 with approximately four volumes of fresh water from the fresh water inlet 17 for each volume of the precipitate, the precipitate is dried to yield about 60 pounds of the solid product on a bone dry basis.

The analysis of such product is set forth in the following Table A, wherein such product is identified as "Trace element concentrate." For comparison purposes, Table A also includes a typical analysis of sea water and a typical analysis of the mineral sea salt obtained by the method of said Evans Patent No. 2,606,839.

Table A

| Element | | Sea Water | Mineral Sea Salt | Trace Element Concentrate |
|---|---|---|---|---|
| Sodium | percent | 1.056 | 27.50 | .50 |
| Magnesium | do | .127 | 3.40 | 33-00 |
| Calcium | do | .040 | .86 | 8-00 |
| Phosphorous | p.p.m. | .001.10 | 50 | 80 |
| Aluminum | p.p.m. | .01.07 | 55 | 600 |
| Strontium | p.p.m. | 13 | 220 | 5,000 |
| Silicon | p.p.m. | .02.04 | | 2,000 |
| Boron | p.p.m. | 4.6 | 97 | 500 |
| Iron | p.p.m. | .002.02 | 100 | 400 |
| Manganese | p.p.m. | .001.01 | .03.3 | 40 |
| Nickel | p.p.m. | .0001 | .003 | 30 |
| Copper | p.p.m. | .001.01 | 20 | 20 |
| Tin | p.p.m. | Present | | 70 |

A semi-quantitative spectrographic analysis of the product or trace element concentrate of this invention shows the following chemical elements to be present in addition to those listed in Table A: Zn, Ti, V, Ba, K, Li, As, U, Bi, Mo, Pb, Ag, Co, and Sb.

From the foregoing Table A, it is evident that greater quantities of the dissolved and suspended trace elements or constituents are obtained in the trace element concentrate formed by the method of this invention than in the mineral sea salt obtained by the method of said Evans patent. It should also be noted that the elements are present in the trace element concentrate in substantially the same ratio as they are found in the sea water, which is indicative of the fact that very little of the trace elements in sea water is lost in this method.

In the following Table B, the yields of magnesium and calcium in the precipitate formed from sea water by this method (Sample 3) as compared to precipitates formed from sea water by other methods (Samples 1 and 2), are set forth wherein:

Sample 1 represents a precipitate from sea water treated with caustic soda wherein the added hydroxyl ions are chemically equivalent to the total magnesium and calcium ions; Sample 2 represents a precipitate from sea water treated with soda ash, the carbonate ion being added chemically equivalent to the total magnesium and calcium ions; and Sample 3 represents a precipitate prepared by treating sea water with caustic soda, the hydroxyl ions being equivalent to the magnesium ions and then treated with soda ash, the carbonate ions added chemically equivalent to the calcium ions.

All three of the above precipitates had the mother liquor siphoned from atop them. Each was dried for twenty-four hours at 110° C.

Table B

| Element | Sample 1 (percent by weight) | Sample 2 (percent by weight) | Sample 3 (percent by weight) |
|---|---|---|---|
| Magnesium | 24 | 8 | 23 |
| Calcium | 2 | 7 | 7 |

The foregoing Table B illustrates that even though less hydroxide is used in Sample 3 than in Sample 1 and less carbonate is used in Sample 3 than in Sample 2, nevertheless the amount of the magnesium and calcium in the precipitate of Sample 3 is about the maximum obtainable. It is very important to have the maximum amount of the magnesium and calcium ions in the precipitate to provide the maximum surface area for the adsorption of the trace elements in the sea water and therefore the combination of the caustic soda and the soda ash, or their equivalents, in treating the sea water is extremely important in obtaining the best results from this method.

The foregoing disclosure and description of the invention is illustrative and explanatory thereof and various changes may be made within the scope of the appended claims without departing from the spirit of the invention.

What is claimed is:

1. A method for the recovery and concentration of chemical elements from a sample of sea water comprising a substantial amount of sodium chloride and magnesium and calcium ions and having dissolved and suspended therein as trace elements phosphorous, aluminum, strontium, silicon, boron, iron, manganese, nickel, copper and tin; comprising the steps of adding to the sample of sea water a quantity of a material selected from the group consisting of sodium hydroxide and potassium hydroxide; said material hydrolyzing in sea water and yielding hydroxyl ions which combine with said magnesium to form a magnesium hydroxide precipitate; and a material selected from the group consisting of sodium carbonate and potassium carbonate; said last mentioned material hydrolyzing in said sea water and yielding carbonate ions which combine with the calcium in the sea water to form a calcium carbonate precipitate; said magnesium hydroxide and calcium carbonate precipitates adsorbing a substantial amount of dissolved and suspended trace elements in the sea water and adsorbing and absorbing sodium chloride; thereafter separating said precipitates from said sea water; then washing the precipitates with fresh water to remove said sodium chloride; and then drying the precipitates containing said trace elements.

2. The method of claim 1 wherein the amounts of said hydroxyl ion yielding material and said carbonate ion yielding material added are stoichiometrically equivalent to the magnesium and calcium ions, respectively, in the sea water.

References Cited in the file of this patent

UNITED STATES PATENTS

| 1,547,111 | Finn | July 21, 1925 |
| 1,953,419 | MacIntire | Apr. 3, 1934 |
| 2,404,550 | Thomsen | July 23, 1946 |
| 2,606,839 | Evans | Aug. 12, 1952 |

OTHER REFERENCES

Commercial Fertilizers, Collins, McGraw-Hill, 5th edition, 1955, pp. 321–323.